United States Patent [19]
Morar

[11] 3,975,645
[45] Aug. 17, 1976

[54] AUTOMOBILE ANTI-THEFT ALARM SYSTEM

[75] Inventor: Michael A. Morar, Hayward, Calif.

[73] Assignee: The Raymond Lee Organization, Inc., a part interest

[22] Filed: Nov. 20, 1974

[21] Appl. No.: 525,307

[52] U.S. Cl.............................. 307/10 AT; 340/63
[51] Int. Cl.² ........................................ B60N 25/10
[58] Field of Search............... 340/63, 64; 307/10 R, 307/10 AT; 180/114

[56] References Cited
UNITED STATES PATENTS

| | | | |
|---|---|---|---|
| 3,755,778 | 8/1973 | Kennedy et al.................... | 340/63 X |
| 3,792,435 | 2/1974 | Pace et al............................. | 340/63 |
| 3,858,175 | 12/1974 | Kopera, Jr............................ | 340/63 |

Primary Examiner—Herman J. Hohauser

[57] ABSTRACT

An anti-theft alarm system employing a timer having a normally closed timer switch which opens automatically within a selected time interval after the timer is energized, a normally deenergized relay having a winding and a set of normally open contacts, an ignition switch, an electrically operated alarm, plurality of trigger switches connected in parallel which are normally open and a battery. First means connect the main switch, timer switch, trigger switch and winding in series across the battery; second means connect said main switch, the alarm and the set of contacts in series across the battery; and the timer is connected in parallel with the winding of the relay.

2 Claims, 4 Drawing Figures

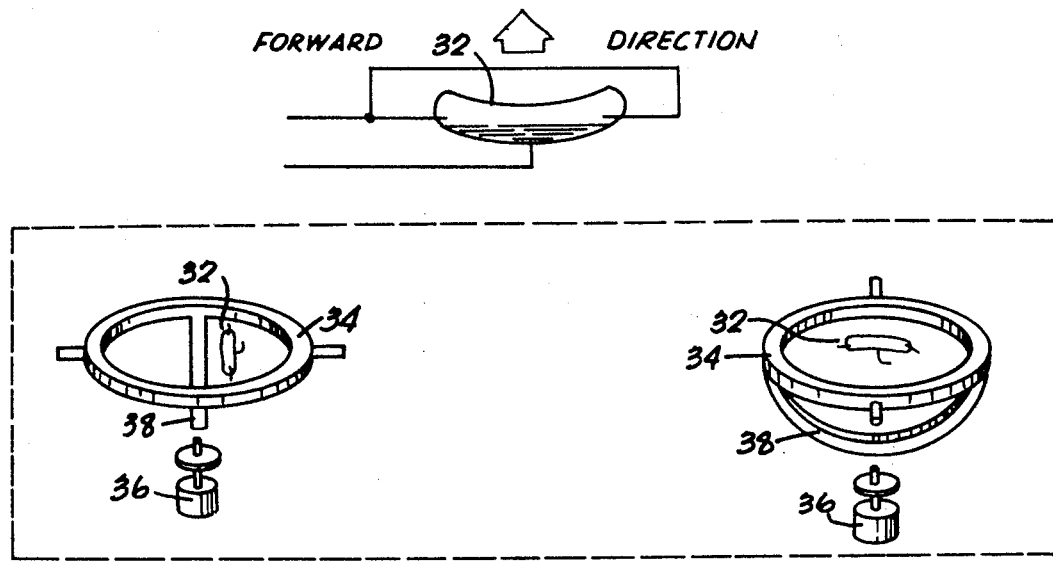
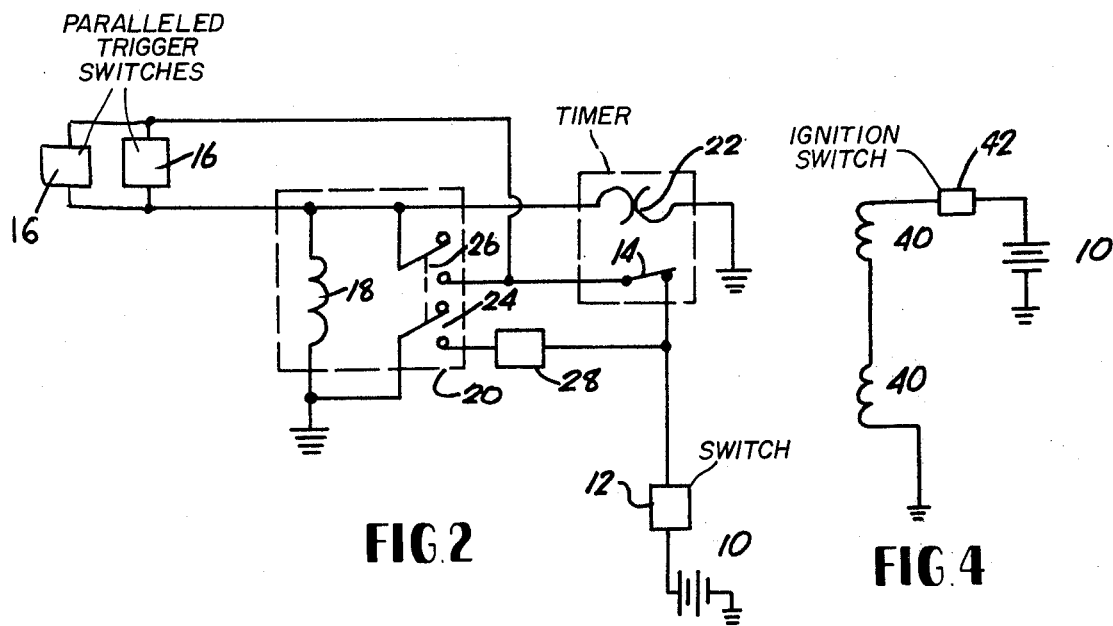
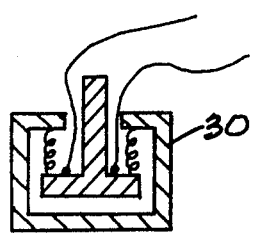

AUTOMOBILE ANTI-THEFT ALARM SYSTEM

SUMMARY OF THE INVENTION

My invention is directed toward an automobile anti-theft alarm system wherein an alarm is sounded whenever the automobile is tampered with by opening a door or moving the automobile in position or raising any part of the vehicle. To this end, special normally open trigger switches connected in parallel and closed by any of the tampering operations referred to complete a circuit causing the alarm to sound. The circuit is completed through a normally closed timer controlled switch of a timer. At the same time, current flows through the timer actuating it. After expiration of a preset interval the timer opens the timer switch, breaking the circuit and disconnecting the alarm.

BRIEF DESCRIPTION OF THE DRAWINGS

In the drawings:

FIG. 1 is a view of certain trigger switches used in my invention;

FIG. 2 is a schematic diagram of my invention;

FIG. 3 is a view of another type of trigger switch; and

FIG. 4 is a circuit diagram illustrating use of the breaker solenoids.

BRIEF DESCRIPTION OF PREFERRED EMBODIMENTS

Referring first to FIG. 2, one side of automobile battery 10 is grounded. The other side of the battery is connected first through main on-off switch 12, normally closed timer switch 14, paralleled trigger switches 16 and winding 18 of relay 20 to ground. Timer 22 is connected in parallel across winding 18. Relay 20 has first and second sets of normally open contacts identified at 24 and 26 respectively. The other side of battery 10 is connected through switch 12, electrically operated alarm 28 and contact set 24 to ground. The other side of the battery is also connected through switch 12, switch 14, contact set 26 and winding 18 to ground.

The system is inoperative when switch 12 is open. The timer is deenergized and switch 14 is closed. When switch 12 is closed and one of the paralleled switches 16 is closed, relay 20 is energized, the alarm sounds and the timer is actuated. At the end of a preselected interval, the timer will open switch 14, deenergizing the relay and cutting off the alarm. The timer can be automatically or manually reset. During this interval, all switches 16 can open, but the relay holding circuit through closed contact set 26 (closed since the relay is energized) keeps the relay energized whereby the alarm continues to sound.

One type of trigger switch shown at 30 (FIG. 3) is spring loaded and normally open. One such switch is used with each door and is closed as soon as the associated door is opened to sound the alarm.

Another such switch is a mercury switch shown at 32 (FIG. 1) which is open when level and is closed when tilted from the horizontal in the longitudinal direction. Two such switches disposed at right angles to each other are used to detect any movement or change in position of the vehicle to close and thus sound the alarm 28. Each switch is disposed in a self leveling mechanism 34 associated with a breaker solenoid 36 and breaker plunger 38. As shown in FIG. 4, the two solenoid windings 40 are connected in series with ignition switch 42 across the battery.

When the solenoids are energized by closing switch 42 and starting the vehicle, the leveling mechanism is released so that switches 32 are self leveling and are open. When switch 12 is turned off and the engine stopped, the plungers clamp mechanisms 34 in a new level position. Any subsequent movement or change in position of the vehicle will cause at least one of switches 32 to close and sound the alarm.

While I have described my invention with particular reference to the drawings, such is not be be considered as limiting its actual scope.

What is claimed is:

1. An automobile anti-theft alarm system comprising:
   a battery connected at one end to ground;
   a main switch connected on one side to the other end of the battery;
   a relay having a normally deenergized winding with one end grounded, said relay having a first set of normally open contacts connected on one side to the other end of the winding and a second set of normally open contacts grounded on one side;
   a timer which can be reset and which is normally deenergized, said timer having a normally closed timer switch, said timer being connected in parallel with the winding, said timer switch being connected between the other side of the main switch and the other side of the first set contacts;
   an electrically operated alarm connected between the other side of the main switch and the other side of the second set contacts; and
   a plurality of normally open trigger switches connected in parallel and disposed between the other end of the winding and the junction of the first set contacts and the timer relay, two of said trigger switches being elongated mercury tilt switches that are open when level and closed when tilted from the horizontal in the vertical direction, the longitudinal axes of the tilt switches being disposed at right angles to each other, the tilt switches being used to detect any movement or change in position of the automobile by closing when any movement or change occurs, said alarm being actuated whenever any trigger switch is closed.

2. The system of claim 1 which is adapted for use in an automobile having a plurality of doors, all trigger switches other than the tilt switches being spring loaded, each spring loaded switch being associated with a corresponding door and being closed when the corresponding door is opened.

* * * * *